United States Patent
Peuramäki

(10) Patent No.: US 7,223,313 B2
(45) Date of Patent: *May 29, 2007

(54) INSULATION MATERIAL AND METHOD FOR MANUFACTURING THE INSULATION

(75) Inventor: Juhani Peuramäki, Valkeakoski (FI)

(73) Assignee: UPM-Kymmene Corporation (FI)

( * ) Notice: Subject to any disclaimer, the term of this patent is extended or adjusted under 35 U.S.C. 154(b) by 441 days.

This patent is subject to a terminal disclaimer.

(21) Appl. No.: 10/744,438

(22) Filed: Dec. 23, 2003

(65) Prior Publication Data

US 2004/0137245 A1    Jul. 15, 2004

Related U.S. Application Data

(60) Division of application No. 10/081,133, filed on Feb. 22, 2002, which is a continuation of application No. PCT/FI00/00716, filed on Aug. 14, 2000.

(51) Int. Cl.
*B32B 5/20* (2006.01)
*B32B 31/26* (2006.01)

(52) U.S. Cl. ............... 156/78; 156/79; 156/244.11

(58) Field of Classification Search ............ None
See application file for complete search history.

(56) References Cited

U.S. PATENT DOCUMENTS

| | | | |
|---|---|---|---|
| 4,424,254 A | 1/1984 | Hedrick et al. | |
| 4,645,710 A | 2/1987 | Baitinger et al. | |
| 5,024,891 A | 6/1991 | Yoshiga et al. | |
| 5,627,219 A | 5/1997 | Ogawa | |
| 5,753,378 A | 5/1998 | Tebbe | |
| 6,044,604 A | 4/2000 | Clayton et al. | |
| 6,428,882 B1 | 8/2002 | Peiffer et al. | |

FOREIGN PATENT DOCUMENTS

| | | |
|---|---|---|
| DE | 2112751 | 10/1972 |
| DE | 2946855 | 7/1980 |
| DE | 3725866 | 2/1989 |
| DE | 19525861 | 1/1997 |
| DE | 19547672 | 6/1997 |
| DE | 19705511 | 8/1998 |
| DE | 19747947 | 5/1999 |

*Primary Examiner*—Sam Chuan Yao
(74) *Attorney, Agent, or Firm*—Fitch, Even, Tabin & Flannery

(57) ABSTRACT

The invention relates to a coating for insulation material, which coating comprises a metal layer, such as an aluminum layer, and a plastic layer. The plastic layer contains plastic that crystallizes when heated. The plastic can more particularly be a polyamide.

8 Claims, 2 Drawing Sheets

INSULATION MATERIAL AND METHOD FOR MANUFACTURING THE INSULATION

This application is a division of prior application No. 10/081,133, filed on Feb. 22, 2002, which is a continuation of International Application No. PCT/FI00/00716, filed Aug. 24, 2000 and designating the United States of America, which are hereby incorporated herein by reference in their entirety.

FIELD

The invention relates to building materials and applies to a coating for an insulation material. The coating includes metal, such as aluminum. The invention also relates to the manufacture of the coating, and its use in insulation materials. The invention is suitable for use, for example, in insulation materials containing cellular plastics or fibre wool.

BACKGROUND

Various insulation materials, in which a coating has been joined to a porous insulation layer, are applied in construction technology. The coating can be used to improve the insulating properties, durability, fire safety, dimensional stability, or the appearance of the material.

Aluminum foil is often used in the coatings of insulation materials. It is impermeable to gases and is incombustible, and reflects thermal radiation. The aluminum foil is joined to the insulation layer by means of a plastic adhesion layer. The insulation material is manufactured in the following manner: firstly, the adhesion layer is joined to the aluminum sheet, after which the laminate that has thus been produced is joined to the insulation layer. This can be done, for example, with polyurethane while it is still in a reactive state, whereby the layers self-adhere without separate gluing. When there is a gas-tight aluminum layer against the layer of cellular plastic, the propellants in the cellular plastic remain inside it to an optimal degree.

One problem here is, however, the insufficient strength of the coating during the manufacture of the insulation material. The aluminum sheet is easily torn when it is pulled into the machine. For example, during the coating of a polyurethane insulation that is still forming, failures are particularly harmful, as the expanding polyurethane foam is spread and stains the production machinery and floor. In fact, the primary function of the coating in such a situation is to protect the process machinery from reactive and sticky insulation material in the initial phase of the process.

SUMMARY

The present invention relates to a coating for an insulation material comprising a metal layer, such as an aluminum layer, and a plastic layer. The plastic layer contains a plastic that crystallizes when heated. The plastic layer is adhered to the metal layer. The plastic is such that it can be joined to the metal film particularly by extrusion. The plastic may be a polyamide, such as polyamide-6 or polyamide-66. The temperature at which the plastic crystallizes may be, for example, 100 to 160° C. An adhesion layer can also be provided between the metal layer and the plastic layer.

The invention also relates to a method for producing an insulation material coating in which a metal layer, such as for example, an aluminum layer, is joined by extrusion to a plastic layer containing extrudable plastic that crystallizes when heated.

The invention also relates to a manufacturing method for an insulation material in which a coating is joined to an insulation layer such as expended plastic or fiber wool. The coating contains a metal layer, such as for example an aluminum layer, and a plastic layer. In the method, the coating is joined to an insulation layer, and the plastic layer comprises plastic that crystallizes when heated. The plastic layer is heated so that the plastic crystallizes. In particular, the insulation layer may consist of expanded or cellular plastic, such as polyurethane or polystyrene. The coating can thus be attached to the insulation layer while the insulation layer is being formed. When the forming of the insulation layer is exothermic, the heat that is generated can be utilized in crystallizing the plastic of the plastic layer.

During the process of manufacturing the insulation material, the plastic layer protects the coating, especially from tearing. While crystallizing, the plastic layer becomes rigid, and thus the insulation material gains solidity and surface strength.

The invention also relates to an insulation material with an insulation layer having a coating joined to it where the coating includes a metal layer, such as for example an aluminum layer, and a plastic layer which contains a polyamide that crystallizes when heated.

DETAILED DESCRIPTION

Figure 1:
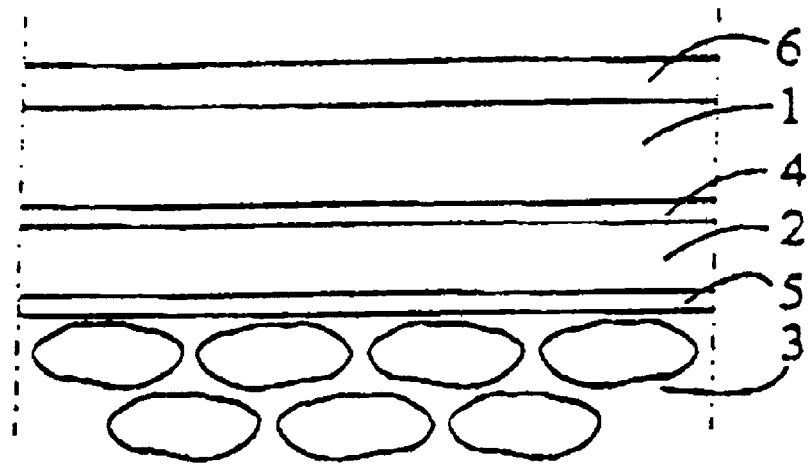
FIG. 1 is a side view of an embodiment of the invention having an expanded polymer.

In the embodiment shown in FIG. 1, a layer 2 (e.g. about 30 g/m$^2$), containing a polyamide-6 that crystallizes when heated, has first been attached to an aluminum layer 1 (e.g. about 50 µm). The coating thus obtained has been joined to the foamed polyurethane layer 3 in such a way that the polyamide layer remains therebetween, and the polyamide layer 2 has been heated in order to crystallize the polyamide.

In order to improve the adhesion between the aluminum layer 1 and the polyamide layer 2, an adhesion layer 4 containing a suitable adhesive plastic is provided between them. Correspondingly, to improve the adhesion between the polyamide layer 2 and the polyurethane layer 3, an adhesion layer 5 is provided between them. Furthermore, the outer surface of the aluminum layer 1 is coated with a surface layer 6 (e.g. HD-polyethylene). The surface layer 6 may contain necessary additives, particularly a fire retardant.

A product according to FIG. 1 can be manufactured particularly by first attaching an adhesion layer 4, a polyamide layer 2, an adhesion layer 5, and a surface layer 6 to the aluminum foil 1 by extrusion in several steps. The extrusion is carried out in such a way that the polyamide will not substantially crystallize. The coating thus formed is attached to an expanded or cellular polyurethane layer 3 while it is being formed. The forming reaction of polyurethane is exothermic, whereby the coating is also heated. During the manufacturing process, the polyamide layer 2 is heated to the crystallization temperature of polyamide (e.g. 120 to 140° C., such as 125 to 135° C., typically about 130° C.), whereupon the polyamide crystallizes. The necessary crystallization time may be, for example, 1 to 5 minutes. In the selection of the polyamide, its extrusion properties are also taken into account.

Using the coextrusion technique can reduce the number of manufacturing phases.

The polyamide in the polyamide layer 2 is flexible and glutinous or viscous when uncrystallized. Thus, the coating is easily runnable, and it withstands the process well without tearing. When it crystallizes, the polyamide layer becomes stronger and stiffer, thereby producing an insulation material that is sufficiently strong and stiff in use. The crystallized polyamide also increases bursting strength.

Figure 2:
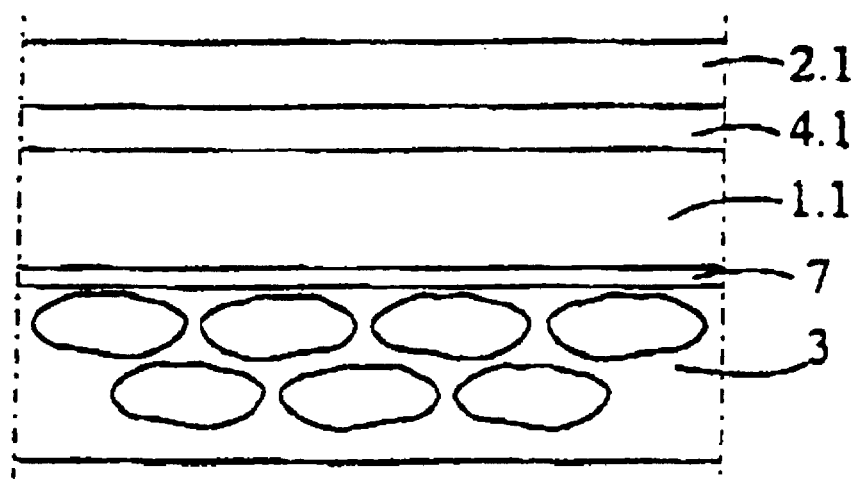
FIG. 2 is a side view of an alternate embodiment of the invention.

In the embodiment shown in FIG. 2, there is an aluminum layer 1.1, on top of which a polyamide-6 layer 2.1 has been applied. The coating thus formed has been attached to the polyurethane layer 3.1 in such a way that the aluminum layer 1.1 remains there-between.

In order to enhance the adhesion of the aluminum layer 1.1 and the polyamide layer 2.1, an adhesion layer 4.1 is provided between them. The adhesion layer 4.1 may contain a pigment more particularly a white pigment. Correspondingly, in order to increase the adhesion between the aluminum layer 1.1 and the cellular polyurethane layer 3, a lacquer layer 7 (e.g. about 2 μm) is provided between them.

The insulation material according to FIG. 2 can be manufactured similarly to the material according to FIG. 1 described above. The coating can be formed by coextrusion in two steps, more particularly by attaching first a polyamide layer 2.1 and an adhesion layer 4.1 to each other, and then these layers to an aluminum layer 1.1 and an adhesion layer 7.

Figure 3:
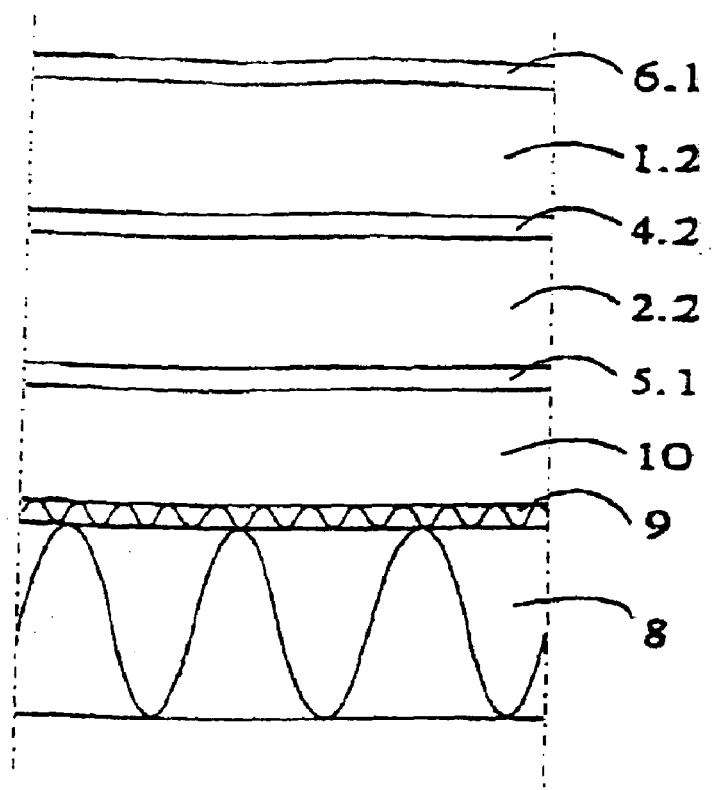
FIG. 3 is a side view of an alternate embodiment of the invention having a fibrous material.

In the embodiment shown in FIG. 3, there is a layer of fibre wool 8 (e.g. mineral wool, about 50 mm), on top of it a layer of a non-woven mat 9 (e.g. glass fibre mat, about 50 g/m$^2$), a plastic layer 10 (e.g. polyethylene, about 40 μm$^2$), an adhesion layer 5.1 (e.g. about 2 μm), a polyamide layer 2.2 (e.g. about 30 μM), an adhesion layer 4.2 (e.g. about 2 μm), a layer of aluminum foil 1.2 (e.g. about 50 μm), and a lacquer layer 6.1 (e.g. about 3 μm). During the manufacture, heat is introduced from above through the entire layer. Melting occurs at a temperature of, for example, 140 to 160° C., typically at approximately 150° C.

Figure 4:
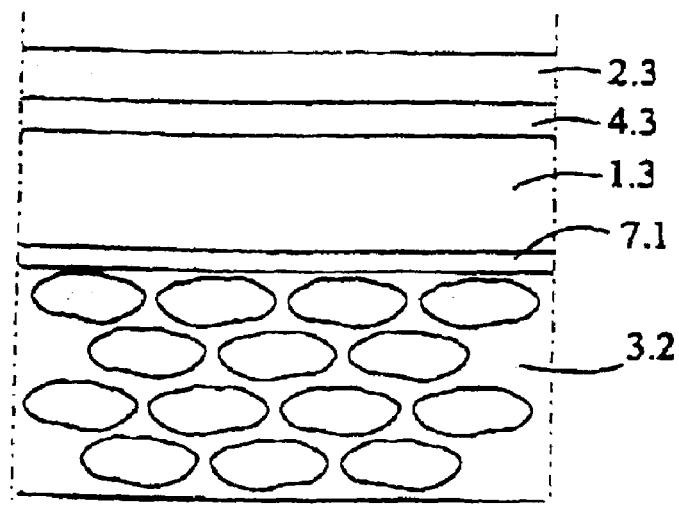
FIG. 4 is a side view of an alternate embodiment of the invention.

Furthermore, FIG. 4 presents a product corresponding to FIG. 2, in which the insulation is a layer of polystyrene foam (EPS) 3.2. On top of it, there is a layer of hot seal lacquer 7.1 (e.g. about 2 μm), a layer of aluminum foil 1.3, an adhesion layer 4.3 (e.g. about 2 μm), and a polyamide layer (e.g. about 30 μm). In the manufacture, the heat is applied from above. The polystyrene foam 3.2 melts and adheres to the hot seal lacquer 7.1.

The insulation materials according to the invention can be manufactured to meet fire regulation norms.

What is claimed is:

1. A method for manufacturing a porous insulation material comprising a porous insulation layer, a metal layer and a polyamide layer, and two adhesive layers, the method comprising:

extruding one of the adhesive layers onto the metal layer;

extruding a glutinous not substantially crystalline polyamide onto the extruded adhesive on the metal layer to form a metal/glutinous polyamide layer;

forming the porous insulation layer;

adhesively affixing the glutinous polyamide/metal layer with the extruded adhesive to the insulation layer while the porous insulation layer is being formed and the polyamide is glutinous and not substantially crystalline to form a metal/glutinous polyamide/insulation layer; and heating the glutinous polyamide in the metal/glutinous polyamide layer and crystallizing the polyamide in the metal/glutinous polyamide/insulation layer and form the insulation material.

2. The method of claim 1 wherein the metal layer is an aluminum layer.

3. The method of claim 1 wherein the polyamide is selected from the group consisting of polyamide-66, polyamide-6 and mixtures thereof.

4. The method of claim 1 wherein the glutinous polyamide is heated to about 100 to about 160° C.

5. The method of claim 1 wherein the insulation layer includes an expanded plastic.

6. The method of claim 5 wherein the insulation layer expanded polystyrene.

7. The method of claim 1 wherein during the formation of the insulation layer, an amount of heat is generated that is effective for crystallizing the glutinous polyamide in the metal/glutinous polyamide/insulation layers.

8. The method of claim 1 wherein the extruded adhesive layer and the glutinous polyamide are coextruded together onto the metal layer.

* * * * *